United States Patent [19]
Froling et al.

[11] Patent Number: 5,461,938
[45] Date of Patent: Oct. 31, 1995

[54] CONTROL CABLE END CONNECTOR

[75] Inventors: Thomas H. Froling, Royal Oak; Thomas A. Nistor, Sterling Heights; Stephen Sigety, Jr., Mt. Clemens, all of Mich.

[73] Assignee: General Motors Corporation, Detroit, Mich.

[21] Appl. No.: 287,546

[22] Filed: Aug. 8, 1994

[51] Int. Cl.⁶ .............................. F16C 1/14; F16G 11/00
[52] U.S. Cl. ............................... 74/502.4; 403/353
[58] Field of Search ............... 74/502.4, 502.6; 403/353, 329, 326, 289

[56] References Cited

U.S. PATENT DOCUMENTS

| | | | |
|---|---|---|---|
| 3,929,031 | 12/1975 | Webb | 74/501 R |
| 3,955,441 | 5/1976 | Johnson | 74/501 R |
| 4,339,213 | 7/1982 | Gilmore | 74/502.4 X |
| 4,726,251 | 2/1988 | Niskanen | 74/502 |
| 4,773,280 | 9/1988 | Baumgarten | 74/502.4 X |
| 4,829,845 | 5/1989 | Suzuki | 74/502.4 |
| 4,903,541 | 2/1990 | Shiota | 403/329 X |

FOREIGN PATENT DOCUMENTS

| | | | |
|---|---|---|---|
| 0040550 | 11/1981 | European Pat. Off. | 74/502.4 |
| 0086717 | 8/1983 | European Pat. Off. | 74/502.4 |

*Primary Examiner*—Rodney H. Bonck
*Assistant Examiner*—Mary Ann Battista
*Attorney, Agent, or Firm*—Jeffrey A. Sedler

[57] ABSTRACT

A control cable end connector offering positive locking and positive sealing features for control cable connection. A connector feature is molded on the cable sleeve becoming a permanent part of the cable assembly. An acoustic cup is positioned on the connector which slides along the connector and includes two cantilevered locking hooks. The connector locates through an opening in a substantially flat portion of a wall by capturing the wall between two flanges. The acoustic cup seals the end connector area of the wall and snaps into the substantially flat wall providing a positive lock against the removal of the connector.

4 Claims, 4 Drawing Sheets

CONTROL CABLE END CONNECTOR

This invention relates to a connector and more particularly to a connector for a control cable that provides positive locking and positive sealing features.

Control cables are widely used as a means of providing remote operating capability for a device. Conventional control cables can be found in widespread use in most industries, including the automotive industry in such applications as transmission, brake and clutch controls. Automotive control cables provide a convenient method of operating devices that are exposed to elements such as noise, liquids and dust from within the passenger compartment of the vehicle which is isolated from the elements. In other applications control cables provide a convenient means of operating a device from outside the wall of a chamber without passing contaminants into the chamber.

Conventional control cables comprise an inner cable that extends through a conduit. A control cable is generally flexible so that it can be disposed through an indirect route between the control point and the controlled device. A cable typically slides through the conduit and provides a means of supplying motion to an element of the controlled device. The conduit requires an end point which is stabilized and inhibited from moving so that the cable can extend therefrom and be attached to the controlled device.

A need exists for control cable end connections that provide a stable means of attachment for the end of the conduit, provide acceptable levels of ambient element isolation between the controlled device and the point of control and are easily assembled.

SUMMARY OF THE INVENTION

A control cable end connector according to the present invention exhibits positive locking and positive sealing features for control cable connections. The connector includes a locking feature which is integrally molded with the cable assembly so that it becomes a permanent part of the cable assembly. The connector locates in an opening of a substantially flat wall by utilizing opposing flanges between which the wall is captured to prevent rotation and translation of the connector in all directions except the installation and removal directions. A gasket is preferably installed on the connector to mate with one of the two flanges and to provide added security to the connection.

An acoustic cup is molded as a second component to the assembly which includes a plurality of cantilevered locking hooks. The acoustic cup is slidable along the connector to snap the cantilevered locking hooks into the wall, providing a positive locking feature against movement in the removal direction of the connector. When properly positioned, the acoustic cup inhibits the transmission of sound and other elements through the connector mounting openings of the wall.

Through the easily assembled features of this invention the control cable end connector is positively locked in place and provides a positive sealing feature to prevent the transmission of noise and other elements between the controlled device and point of control. The integration of the components of the cable assembly assists in providing ease of installation and removal.

DETAILED DESCRIPTION OF THE PRESENTLY PREFERRED EMBODIMENT

Figure 1:
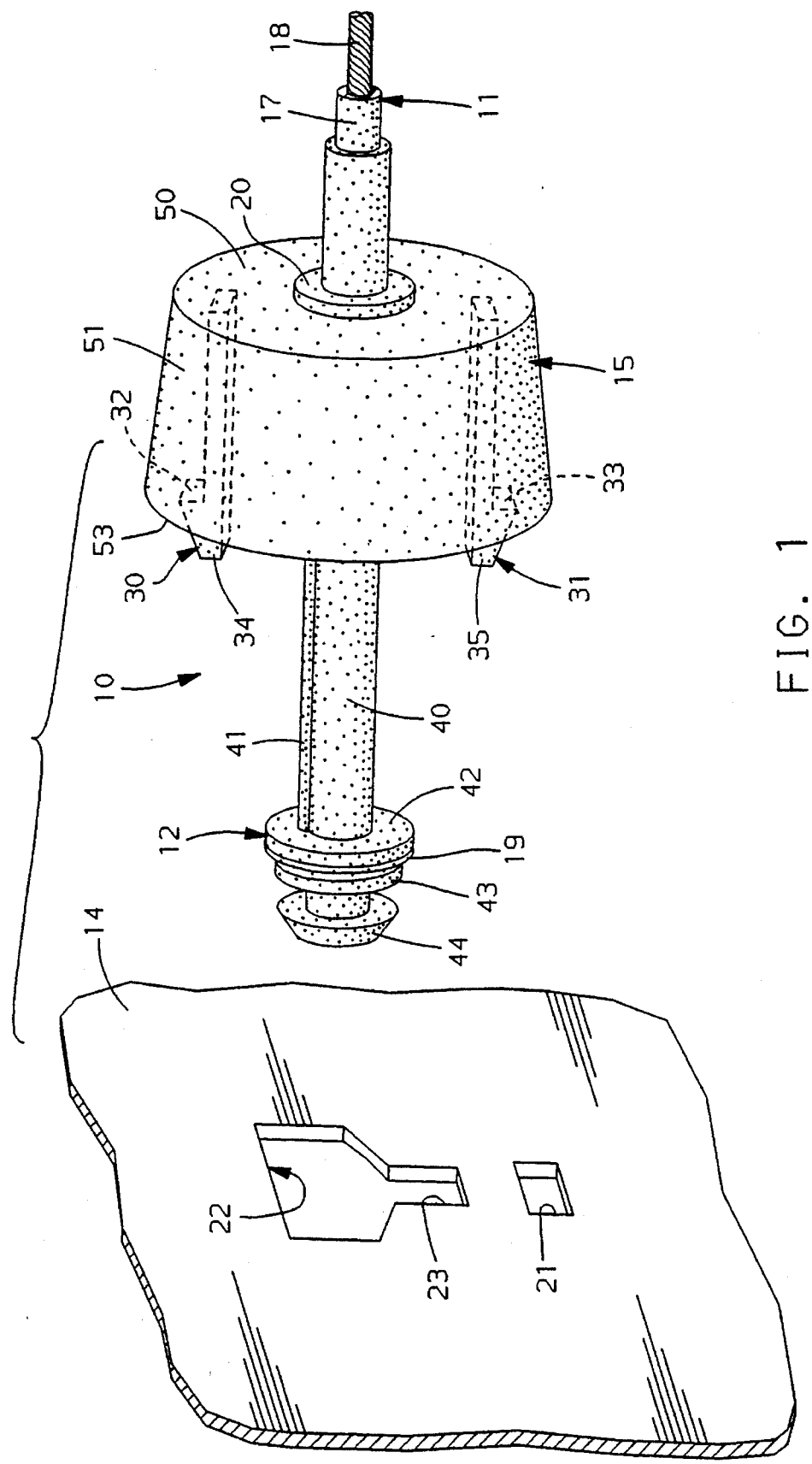
FIG. 1 is a perspective view of a control cable end connector located adjacent to its mounting wall.

Referring to the drawings, FIG. 1 illustrates a control cable end connector assembly 10. Connector assembly 10 includes connector 12 and acoustic cup 15. Connector 12 is shown disposed outside of its normally assembled position in mounting wall 14. The connector 12 includes cylindrical body 40 with enlarged end 44. Two annular flanges 42 and 43 are disposed on cylindrical body 40 near enlarged end 44. Annular flange 42 is further from enlarged end 44 than annular flange 43 and is also larger in diameter. Near the opposite end of cylindrical body 40 from enlarged end 44 is annular stop 20. Extending between annular flange 42 and annular stop 20 is radially extending key 41.

Connector 12 is integrally molded on cable assembly 11. Cable assembly 11 is comprised of a conduit designated as sleeve 17 and cable 18. Sleeve 17 is fixed in position relative to connector 12 and cable 18 is slidable through sleeve 17 and connector 12.

Molded onto connector 12 and positioned between annular flange 42 and stop 20 is acoustic cup 15. Acoustic cup 15 is illustrated in cross-section in FIG. 4. Acoustic cup 15 comprises disk-shaped base 50 through which axial opening 28 extends. Axial opening 28 includes key way 29 which mates with radially extending key 41 to positively radially locate acoustic cup 15 on connector 12. Acoustic cup 15 is slidable axially along cylindrical body 40 between annular flange 42 and annular stop 20.

Figure 4:
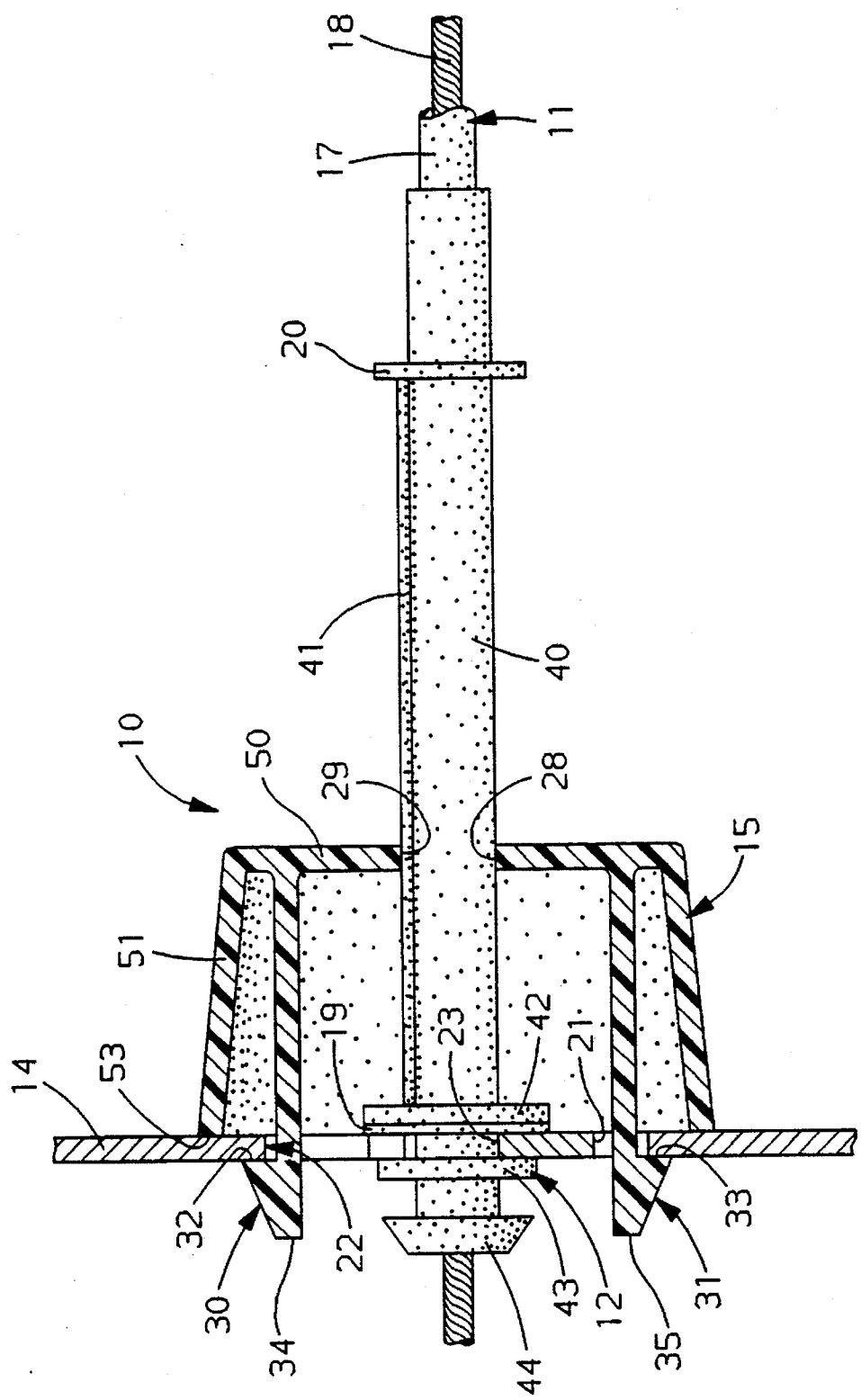
FIG. 4 is a cross-sectional illustration taken generally through the plane indicated by the line 4—4 in FIG. 3.

Extending from the outer perimeter of base 50 is frusto-conical wall 51 which terminates at annular edge 53. Also extending from base 50 within frusto-conical wall 51 are two cantilevered legs 30 and 31. Cantilevered legs 30 and 31 extend further from base 50 than annular edge 53. Positioned near the ends 34 and 35 of cantilevered legs 30 and 31 are hooks 32 and 33 which are directed radially outward. As illustrated in FIG. 4 in the mounted position acoustic cup 15 is disposed such that annular edge 53 is biased against mounting wall 14.

Figure 2:
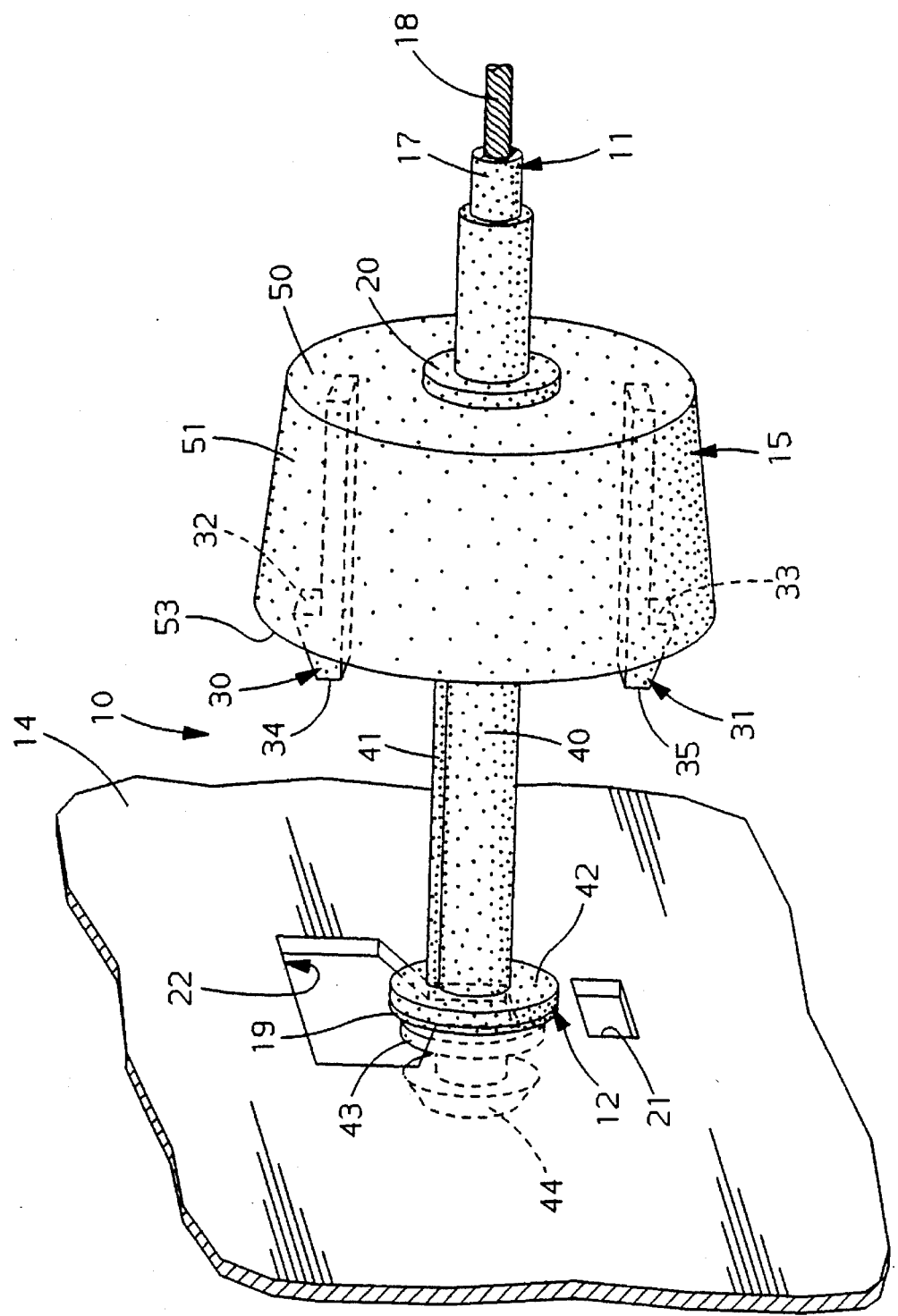
FIG. 2 is a perspective illustration of a control cable end connector positioned in its mounting wall with the acoustical cup retracted.

Referring to FIG. 1, wall 14 includes two openings for mounting connector assembly 10. The first opening, keyhole opening 22, includes slot portion 23. The second opening is slot 21. As illustrated in FIG. 2, cylindrical body 40 of connector 12 is disposed in the slot portion 23 of keyhole opening 22. Mounting wall 14 is captured between annular flange 43 and annular flange 42. Positioned between annular flange 42 and mounting wall 14 is gasket 19.

Cantilevered legs 30 and 31 are illustrated in FIG. 4 disposed through mounting wall 14. Cantilevered leg 30 is positioned in keyhole opening 22 with hook 32 capturing mounting wall 14. Cantilevered leg 31 is positioned through slot 21 with hook 33 capturing mounting wall 14. When properly positioned, annular edge 53 is biased against wall 14 with cantilevered legs 30 and 31 positively locking connector assembly 10 in place.

Figure 3:
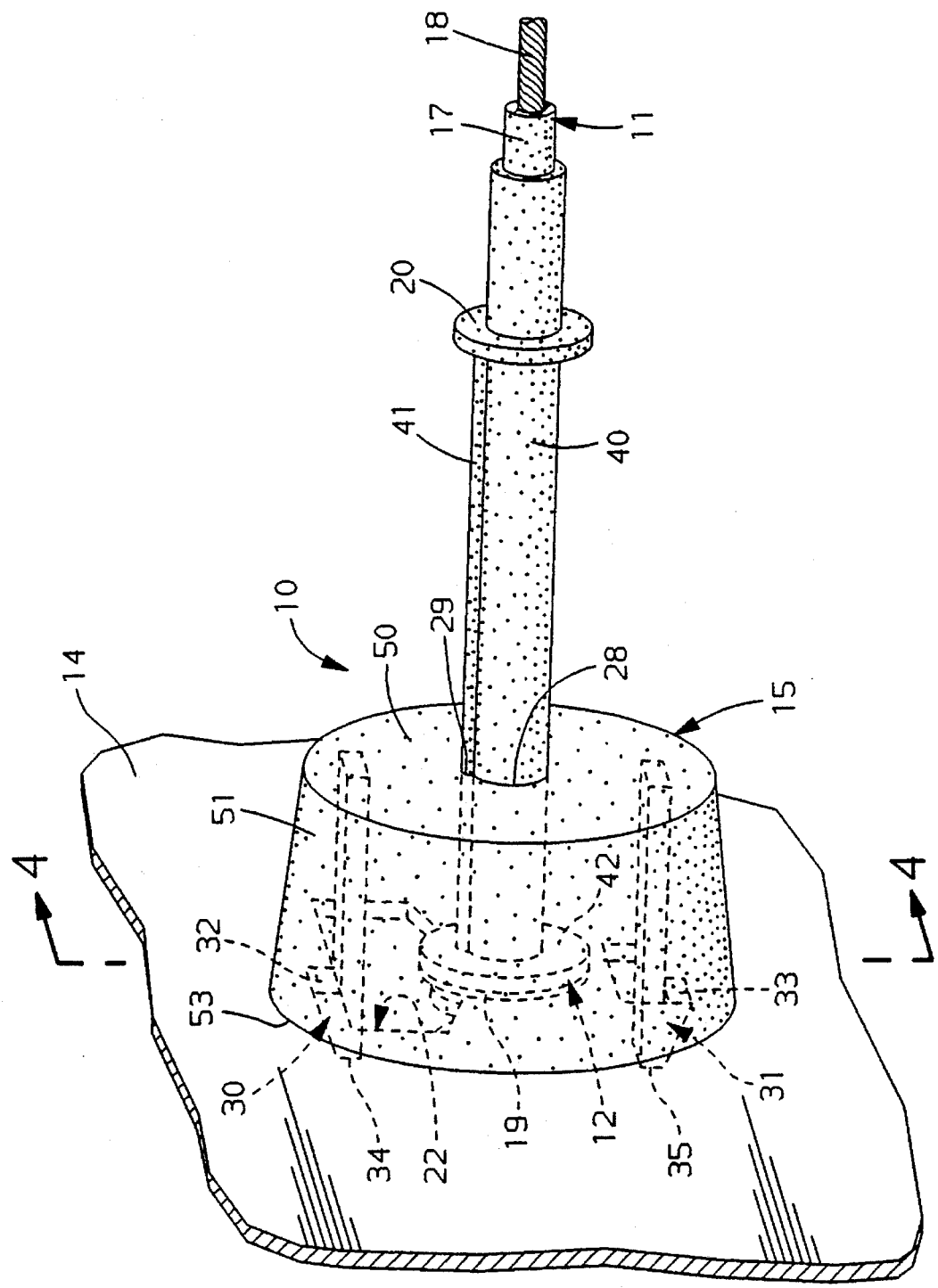
FIG. 3 is a perspective illustration of a control cable end connector positioned in its mounting wall with the acoustical cup attached to the mounting wall.

FIGS. 1 through 3 illustrate in succession the attachment of the control cable end connector assembly 10. In FIG. 1, connector 12 is shown prior to mating with mounting wall 14 with acoustic cup 15 retracted against stop 20. In FIG. 2, cylindrical body 40 has been positioned in slot portion 23 of keyhole opening 22 with annular flange 43 and annular flange 42 positioned on opposite sides of mounting wall 14. During assembly, annular flange 43 passes through keyhole opening 22. Annular flange 42 is larger in diameter than annular flange 43 and does not pass through keyhole opening 22. Following insertion of connector 12 in keyhole opening 22, the segment of cylindrical body 40 between annular flanges 42 and 43 is forced into slot portion 23. Wall 14 is thereby, captured between annular flange 43 and annular flange 42, prohibiting axial translation of connector 12.

FIG. 3 illustrates the final assembly position of the control cable end connector assembly 10. Acoustic cup 15 has been slidably repositioned along cylindrical body 40 so that cantilevered legs 30 and 31 are snap fittingly attached to mounting wall 14. When the cantilevered legs 30 and 31 are locked in position tactile feedback of the hooks 32 and 33 snapping against the mounting wall 14 is sensed.

In the final assembled position of FIG. 3, connector 12 is positively locked onto mounting wall 14 through the interaction of cylindrical body 40, annular flanges 42 and 43 and cantilevered legs 30 and 31. Additionally, noise and elements are isolated from being transferred between the two sides of mounting wall 14 by acoustic cup 15 which is locked in position with annular edge 53 biased against mounting wall 14. Connector assembly 10 is capable of attachment in the position illustrated in FIG. 3, or alternately, connector 12 and acoustic cup 15 are rotatable 180°. By deflecting hooks 32 and 33 radially inwardly the assembly is unlocked and may be removed from mounting wall 14.

What is claimed is:

1. An end connector for use with a control cable which is attachable to a wall that has an opening and a slot comprising:

a connector element including a cylindrical body with first and second ends having first and second annular flanges disposed adjacent to the first end of the cylindrical body, the second annular flange disposed further from the first end of the cylindrical body than the first annular flange and being larger in diameter, the cylindrical body between the first and the second annular flanges being engagable with the opening;

a slidable cable extending through the connector element; and an acoustic cup slidably coaxially disposed on the cylindrical body further from the first end of the cylindrical body than the second annular flange including two cantilevered legs with hooks engagable with the opening and the slot.

2. An end connector according to claim 1 further comprising a stop disposed near the second end of the cylindrical body wherein the acoustic cup is disposed on the cylindrical body between the second annular flange and the stop and is slidable between the second annular flange and the stop.

3. An end connector for use with a control cable which is attachable to a substantially flat portion of a wall that has a keyhole opening and a slot opening comprising:

a connector element including a cylindrical body with first and second ends having first and second annular flanges disposed adjacent to the first end of the cylindrical body, the second annular flange disposed further from the first end of the cylindrical body than the first annular flange and being larger in diameter, the cylindrical body between the first and the second annular flanges being engagable with the keyhole opening;

a slidable cable extending through the connector element;

a stop disposed near the second end of the cylindrical body;

a radially extending key disposed on the cylindrical body between the second annular flange and the stop; and an acoustic cup slidably coaxially disposed on the cylindrical body between the second annular flange and the stop having a key way cooperating with the radially extending key to prevent relative rotational movement between the connector element and the acoustic cup, the acoustic cup including two cantilevered legs with hooks for engaging the keyhole opening and the slot opening.

4. An end connector assembled to a control cable and attachable to a substantially flat portion of a wall that has a keyhole opening and a slot opening comprising:

a connector element including a cylindrical body with first and second ends having first and second annular flanges disposed adjacent to the first end of the cylindrical body, the second annular flange disposed further from the first end of the cylindrical body than the first annular flange and being larger in diameter, the cylindrical body between the first and the second annular flanges being engagable with the keyhole opening so that the wall adjacent to the keyhole opening is captured between the first and the second annular flanges;

a gasket positioned adjacent the second annular flange for engagement with the wall;

a slidable cable extending through the connector element;

a stop disposed near the second end of the cylindrical body;

a radially extending key disposed on the cylindrical body between the second annular flange and the stop; and an acoustic cup slidably coaxially disposed on the cylindrical body between the second annular flange and the stop having a key way cooperating with the radially extending key to prevent relative rotational movement between the connector element and the acoustic cup, the acoustic cup including two cantilevered legs with hooks for engaging the keyhole opening and the slot opening to releasably attach the acoustic cup to the wall and including an annular edge biased against the wall.

\* \* \* \* \*